United States Patent [19]

Verra

[11] Patent Number: 5,499,887
[45] Date of Patent: Mar. 19, 1996

[54] ELECTRIC RETRACTABLE BOUNDARY MARK

[75] Inventor: Yvan Verra, Morieres-Les-Avignon, France

[73] Assignee: Urbaco (S.A.R.L.), Vedene, France

[21] Appl. No.: 256,612

[22] PCT Filed: Dec. 15, 1993

[86] PCT No.: PCT/FR93/01250

§ 371 Date: Jul. 14, 1994

§ 102(e) Date: Jul. 14, 1994

[87] PCT Pub. No.: WO94/15027

PCT Pub. Date: Jul. 7, 1994

[30] Foreign Application Priority Data

Dec. 22, 1992 [FR] France ................................. 92 15754

[51] Int. Cl.⁶ ............................................. E01F 9/00
[52] U.S. Cl. ....................................... 404/6; 49/49
[58] Field of Search ......................... 404/6, 9, 11; 49/49, 49/131, 35

[56] References Cited

FOREIGN PATENT DOCUMENTS 2101180  1/1983  United Kingdom ................ 404/6

Primary Examiner—William P. Neuder
Attorney, Agent, or Firm—Harrison & Egbert

[57] ABSTRACT

A retractable boundary mark, particularly a road boundary mark, comprising a movable boundary mark body (5) which can move inside a corresponding housing or casing (4), whose upper side is open, from a working position wherein said body (5) fixedly extends above the level of the open end of the housing (4) to a resting position wherein said body (5) extends so that its top is approximately level with the housing (4) open end, characterized in that the body of said movable boundary mark (5) forms an integrated electric distribution point which is supplied by a source of electric power (20) so that at least one current consumer (21, 22) can work, said consumer being placed on the body of the movable boundary mark (5) or connected to the latter thanks to a cable (23).

8 Claims, 1 Drawing Sheet

ELECTRIC RETRACTABLE BOUNDARY MARK

TECHNICAL FIELD

The present invention relates to a retractable boundary mark, and more particularly a road boundary mark.

BACKGROUND ART

Similar boundary marks are already known and consist of a movable body which can move inside a corresponding housing or a casing whose upper side is open, from a working position wherein said body fixedly extends above the level of the open end of the housing, to a resting position wherein said body extends so that its top is approximately level with the housing open end.

It has already been disclosed in patent n° 86 05310 filed by the present applicant that such boundary marks can be equipped with driving means, whether or not remote, consisting of a single acting pneumatic jack, for example, whose cylinder is connected to a pressure fluid source through a feeding pipe.

Other boundary marks are also known which are more simple and work thanks to manually driven mechanical means.

In all the aforesaid arrangements, the retractable boundary marks are designed to allow or prohibit access to a roadway or a place on public or private roads, for example.

The above-mentioned arrangements and therefore all the retractable boundary marks have the same disadvantage, namely they are dangerous because of the relief they form above the ground thereby creating an obstacle which is not always visible to someone inattentive due to its small height.

Of course, such disadvantage increases at night in places with poor or no lighting, or even during the day when the weather is bad.

Another disadvantage thereof appeared with the boundary marks which are driven by pneumatic, electric or hydraulic means equipped with remote control.

Actually, in the latter case, the boundary mark unexpectedly coming out from its housing in order to reach its working position can be dangerous for someone inattentive and thus taken aback.

At first, it seemed therefore necessary to focus the invention on the need to indicate the presence of such boundary marks both when they are coming out and when they are in their working position.

SUMMARY OF THE INVENTION

To do so, according to a first characteristic of the invention, the body of the movable boundary mark forms an integrated electric distribution point which is supplied by a source of electric power in order that at least one current consumer can work, said consumer being placed on the body of the movable boundary mark or connected to the latter thanks to a cable.

In this case, the electric consumer is a safety device placed on the body of the movable boundary mark, which makes it possible to visualize and signal it when it is moving and/or when it is in its working position.

The safety device which is inside the boundary mark comprises visual signalling means which consist of an intermittent or flashing light signals emission when it is moving towards its working position, on the one hand, and a permanent light emission when it is fixed in this position, on the other hand.

Such electric distribution point made of the movable boundary mark body, according to the invention, has many other advantages.

Indeed, these boundary marks also can be used for reserved parking spaces or for temporary or seasonal activities areas, as for example market places, spaces reserved for fun fairs or public fairs in general.

This type of event often requires the use of electric equipment such as motors, turbines etc. as well as lighting devices.

Such consumers are usually power supplied thanks to cables connecting them to distributing boxes which are often far-off. In this case, the cables are either placed on the bare ground all the way to said box, or held overhead with makeshift supports. In both cases, cables are a real danger.

The retractable boundary mark advantageously consists in an electric distribution point according to the invention, and eliminates such disadvantages, since if the consumer to be power supplied can be a safety device comprising visual signalling means as above mentioned, it also can be any other type of consumers such as: driving electric motors, temporary outside lighting equipment, preheats for motorcar engines in cold countries, lighting and domestic appliances for a caravan or a boat alongside the quay, power supply for various electric appliances, floodlights, battery chargers.

In the latter cases, the consumers are power supplied through a boundary mark of the aforesaid type, characterized in that it comprises at least one plug through which an outer consumer can be connected to the current source when said boundary mark is in its working position.

BRIEF DESCRIPTION OF THE DRAWINGS

The present invention will appear more clearly and other characteristics will be more fully set forth in the following description with reference to the appended drawings employed as an illustration only and a non limiting example, and showing one preferred embodiment of the invention wherein.

DETAILED DESCRIPTION OF THE INVENTION

The retractable boundary mark shown on these figures is an automatic remote control boundary mark.

This example has been chosen because it represents the more complicated embodiment, but it is obvious that the invention described herein can be applied to a semi-automatically driven boundary mark, or even a manually driven boundary mark as it is already known in the prior art.

Figure 1:
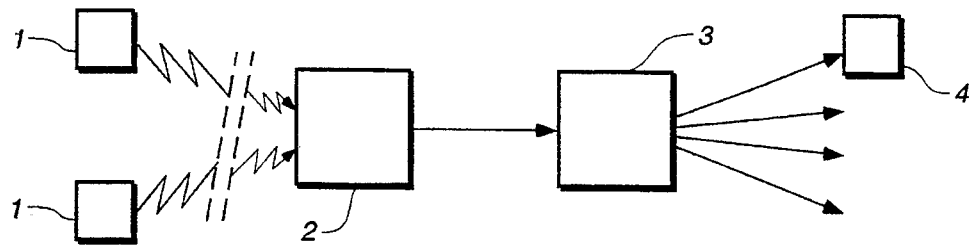
FIG. 1 is a schematic view of a remote control circuit of an electric retractable boundary mark according to the invention.

The remote control device which is represented in FIG. 1 consists of one or several remote control units (1) acting on a control box (2) capable of monitoring an installation (3) providing a fluid, preferably compressed air, acting individually or simultaneously upon one or several boundary mark bodies (5) placed in corresponding casings (4).

The boundary mark body (5) can be operated, raised or lowered, by a jack (6). This boundary mark (5) is solid with a female shaft (7) sliding along a male shaft (8). The latter being solid with a support (9) mounted on elastomer blocks (10).

Guide rings (11) are placed between the male shaft (8) and the female shaft (7). Moreover, guide rails provide the accuracy of the telescopic motion of the boundary mark body (5).

While working, two adjustable means (13) and (15) for restricting the flow of the fluid make it possible to increase or reduce the rate of flow of the fluid thereby increasing or reducing the shifting speed of the jack (6).

Besides, a trip-reversing switch (18) is used for opening and closing the inflow of the fluid under pressure inside the lower chamber of the jack (6) by activating the boundary mark body (5).

For further technical details concerning the embodiment of the controlling device, one should refer to the description of patent application n° 86 05310 which has already been mentioned thereinbefore.

It is the same for the working principle also disclosed in said patent application.

It should only be mentioned that the remote control can be carried out by any means such as a multiple-channel radio transmitter, an ultrasonic transmitter, a ledger reader, a key contact, a keyboard, a magnetic hysteresis loop with or without vehicles identification, a photoelectric or infrared cell safety locking.

According to the invention, the movable boundary mark body (5) consists of an integrated electric distribution point power supplied by a source of a.c. or c.c. electric power (20) in order that at least one current consumer (21) can work, said consumer being placed on said body (5) or (22) connected thereof thanks to a short cable (23).

In this case, the electric consumer is a safety device placed on the movable boundary mark body, which signals the latter when it is moving and/or when it is in its working position.

Actually, such safety device (21) contains visual signalling means consisting in an intermittent light signals (24) emission, called "flashlight".

The light signals (24) can be directional according to a chosen direction or, as it is represented in the figures, omnidirectional. In that case, an impenetrable translucent strip is inserted into the boundary mark, said strip allowing the light near the boundary mark upper part to go through. This embodiment is obviously not restrictive.

According to preferred working characteristics, the light signalling of the boundary mark body (5) is provided by a permanent light emission when it is in its working position, and an intermittent light signals called "flashlight", when it is moving, and particularly towards its working position.

It is understood that other applications can be considered such as, for example, airport lighting requiring the use of visual signalling means consisting in an intermittent light signals emission said "flashlight" and/or a permanent light signals emission according the working cycles predetermined for each type of signals emission.

The retractable boundary mark mentioned herein comprises an automatic remote control but it could also comprise a semi-automatic or even a manual control.

Figures 2, 3:
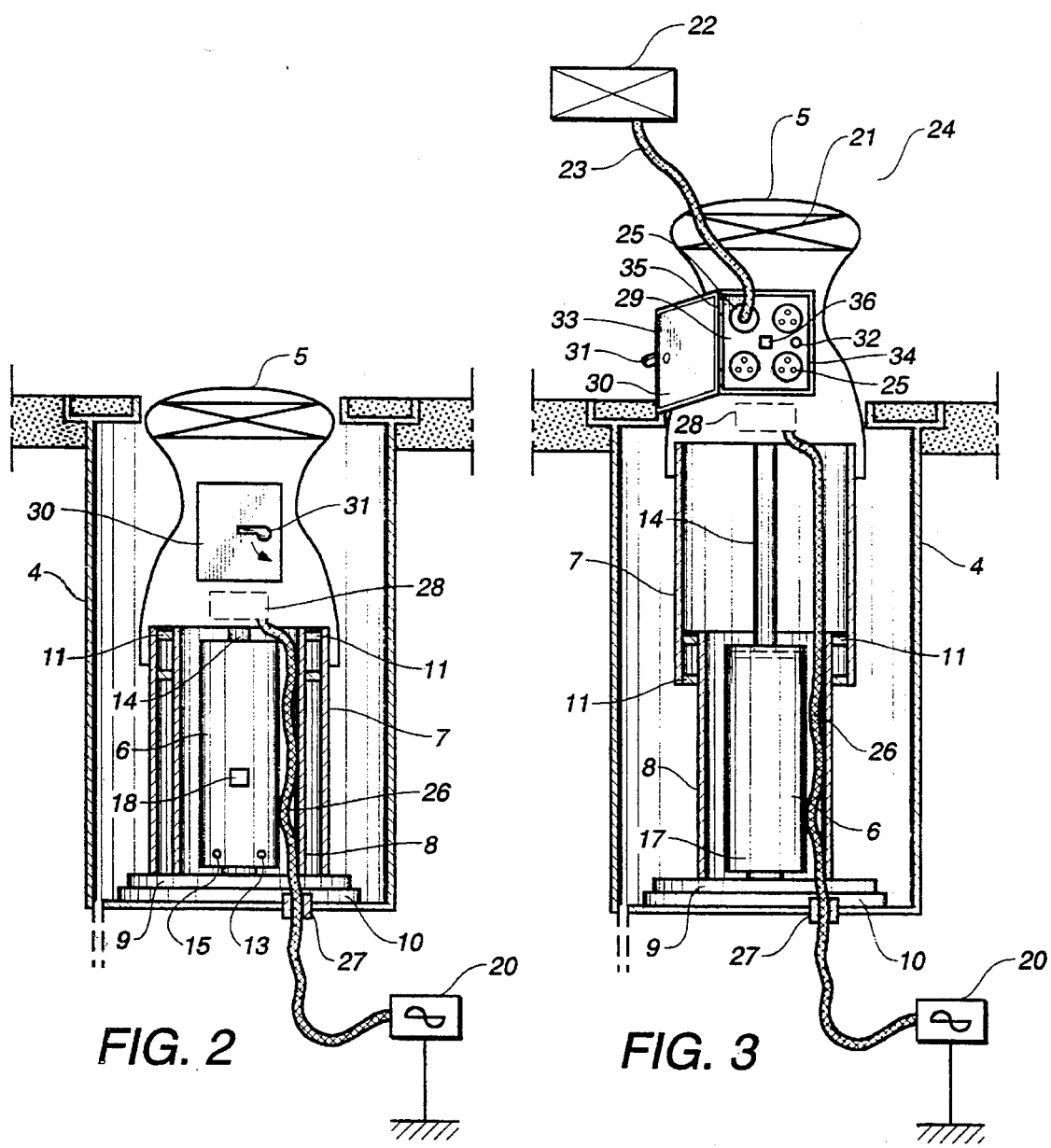
FIG. 2 is a partial longitudinal section of an electric boundary mark according to the invention, in its resting position.
FIG. 3 is a partial longitudinal section of a boundary mark according to the invention, in its working position.

As represented in FIGS. 2 and 3, the boundary mark body (5) comprises several grounded sockets (25) through which an outer consumer (22) can be connected to the electric power source (20).

The connection between the outer consumer (22) and the sockets (25) is carried out thanks to a short cable (23) and a plug matching the socket (25).

On the other hand, the connection between said sockets (25) and the source (20) is carried out thanks to a cable (26) which is long enough to follow the boundary mark (5) motions and thus unlikely to be pulled out. The cable (26) is passed through the bottom wall of the housing (4) by means of a tight cable bushing.

It should also be noted that electric safety means (28) such as a differential circuit breaker for example, are inserted between the sockets (25) and the source (20) and placed inside the boundary mark itself.

There are four sockets (25), however this number can be changed.

It should also be noted that according to the example represented herein, the sockets (25) are placed according to a given direction but, without departing from the invention, one can also consider a boundary mark having a parallelepiped, cylindrical or triangular shape comprising several faces, each of them being equipped with one or several sockets (25).

Whichever the case, the sockets (25) are tight or placed in a tight housing (29) arranged in the boundary mark body (5) and made accessible when the latter is in its working position, thanks to a lockable door (30) comprising a closing handle (31) cooperating with a lock (32), and also tight closing means.

Such tight closing means consist of an elastomer compressible seal (33) placed peripherically inside the door (30) and meant for cooperating with a corresponding machined joint face (34) by crushing the housing (29) thereby made tight when the door (30) is closed, whether the boundary mark is in its resting position into the ground, or in its working position outside the ground.

Preferably, the door (30) is articulated thanks to hinges (35) having a front play so as to distribute the tightening evenly when it is closed, and thereby improve its tightness.

The above described boundary mark comprises means for preventing it to retract in its housing (4) when it is in its working position or when one door (30) at least of a tight housing (29) containing at least one socket (25), is open.

To do so, a micro-contact (36) is activated when the door (30) is open.

Such boundary marks can be used individually or in group. In the latter case, they can be electrically connected to each other according any possible combination.

When it is manually driven, the boundary mark will comprise a locking system, known in the art, which is accessible by means of a key held by an authorized person.

In any case, the mechanical structure of the unit is designed so that it can withstand heavy vehicles going over it when it is retracted, as well as shocks caused by vehicles driving slowly.

It is understood that visual signalling means can be replaced by electric signalling means.

I claim:

1. A retractable boundary mark comprising a movable boundary mark body which can move inside a housing approximately corresponding with a casing whose upper face is open, from a working position wherein said body fixedly extends so that its top is approximately level with an open end of the housing, the movable boundary mark body forming an integrated electric distribution point which is power supplied by a source of electric power in order that at least one consumer being placed on or connected to said movable boundary mark body can work, said boundary mark comprises at least a socket placed in at least one tight housing provided in the body of the boundary mark, said socket enabling an outer consumer to be connected to the source of electric power when said boundary mark is in the working position.

2. The boundary mark according to claim 1, the socket being accessible by a lockable door which also comprises a tight closure.

3. The boundary mark according to claim 2, further comprising means for preventing it from being retracted into its housing when it is in its working position or when at least one door of the tight housing containing at least one socket is opened.

4. The boundary mark according to claim 3, the door of the tight housing containing the socket is articulated by a hinge having a front play so as to distribute the tightening evenly when the door is closed.

5. The boundary mark according to claim 1, further comprising driving means for moving from a resting position to a working position and conversely.

6. The boundary mark comprising a movable boundary mark body which can move inside a housing approximately corresponding with a casing whose upper face is open, from a working position wherein said body fixedly extends so that its top is approximately level with an open end of the housing, the movable boundary mark body forming an integrated electric distribution point which is power supplied by a source of electric power in order that at least one consumer being placed on or connected to said movable boundary mark body can work, wherein the consumer is a safety means arranged on the body of the movable boundary mark, said safety means for displaying a signal when said boundary mark is moving or in the working position, said boundary mark comprises at least a socket for enabling an outer consumer to be connected to the source of electric power when said boundary mark is in the working position.

7. The boundary mark according to claim 6, said safety means comprises an intermittent light signal emission having working cycles which have been predetermined for said signal emission.

8. The boundary mark according to claim 6, said signal being a permanent light emission when the boundary mark is in the working position.

* * * * *